| United States Patent [19] | [11] Patent Number: 4,848,220 |
| Burdette et al. | [45] Date of Patent: Jul. 18, 1989 |

[54] ELECTRIC POWERED NUT CRACKER

[76] Inventors: George H. Burdette, 2139 Causton Bluff Rd., Savannah, Ga. 31404; George Spector, 233 Broadway, Rm 3815, New York, N.Y. 10007

[21] Appl. No.: 231,257

[22] Filed: Aug. 11, 1988

[51] Int. Cl.[4] .............................................. A23N 5/00
[52] U.S. Cl. ...................................... 99/572; 99/579; 99/580
[58] Field of Search .......................... 99/568, 571–573, 99/574, 577, 579, 580, 581–583; 30/120.1, 120.2

[56] References Cited

U.S. PATENT DOCUMENTS

| 1,160,376 | 11/1915 | Canale | 99/572 |
| 1,208,324 | 12/1916 | Jones | 99/572 |
| 1,470,247 | 10/1923 | Wilms | 99/572 |
| 1,482,018 | 1/1924 | Leonard | 99/572 |
| 1,767,917 | 6/1930 | Demek | 99/580 |
| 2,002,289 | 5/1935 | Hancock | 99/582 X |
| 3,858,501 | 1/1975 | Pfeiffer | 99/582 X |
| 4,603,624 | 8/1986 | Greenblatt | 99/580 |

Primary Examiner—Timothy F. Simone

[57] ABSTRACT

An electric powered portable nutcracker is provided that includes an actuator for forcing a piston to move in a direction toward a stationary jaw to crack a nut so that the broken shells can fall into a compartment in the base. The nutcracker can be structured so that it will separate the nut from the cracked shells into two different segments of the compartment in the base.

1 Claim, 1 Drawing Sheet

ELECTRIC POWERED NUT CRACKER

BACKGROUND OF THE INVENTION

The instant invention relates generally to nutcrackers and more specifically it relates to an electric powered portable nutcracker.

Numerous nutcrackers have been provided in prior art that are adapted to separate the nuts from the shells within a compartment so as to prevent the shells from exiting the nutcrackers. For example, U.S. Pats. Nos. 3,496,975; 3,713,468 and 3,841,212 all are illustrative of such prior art. While these units may be suitable for the particular purpose to which they address, they would not be as suitable for the purposes of the present invention as heretofore described.

SUMMARY OF THE INVENTION

A primary object of the present invention is to provide an electric powered portable nutcracker that will overcome the shortcomings of the prior art devices.

Another object is to provide an electric powered portable nutcracker that has an actuator for forcing a piston to move in a direction toward a stationary jaw to crack a nut so that the broken shells can fall into a compartment in the base.

An additional object is to provide an electric powered portable nutcracker that will separate the nut from the cracked shells into two segments of a compartment in the base of the nutcracker.

A further object is to provide an electric powered portable nutcracker that is simple and easy to use.

A still further object is to provide an electric powered portable nutcracker that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
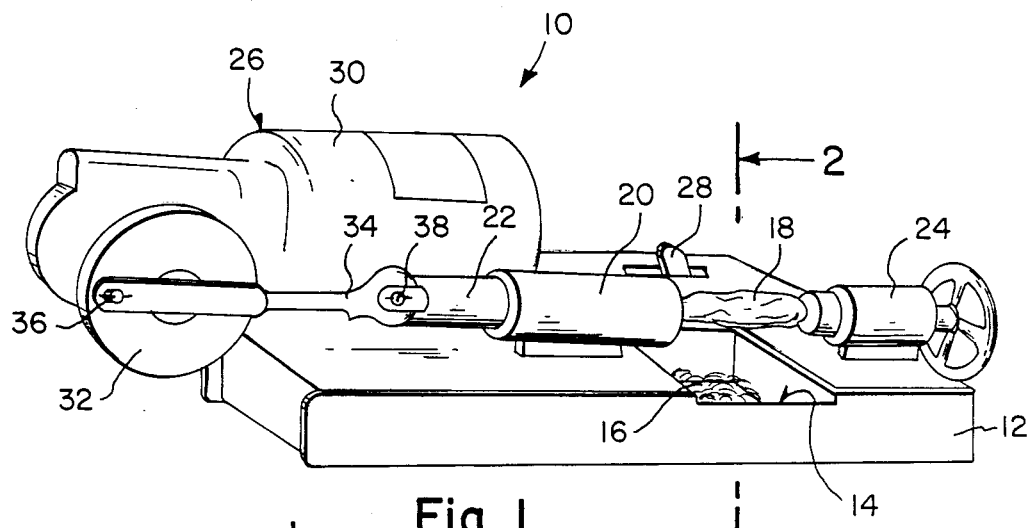
FIG. 1 is a perspective view of the invention.

Turning now descriptively to the drawings, in which similar reference characters denote similar elements throughout the several views, FIG. 1 illustrates an electric powered portable nutcracker 10. A rigid elongated base 12 that has an open top compartment 14 is for receiving broken shells 16 of a nut 18. A hollow guide sleeve 20 is rigidly fixed to and extends along the base 12. A reciprocable piston 22 is slidingly moveable along and guided by the guide sleeve 20. An opposed spaced adjustable threaded stationary jaw 24 is secured a forward end of the base 12 whereby the guide sleeve 20 and the stationary jaw 24 are located on opposite sides of the compartment 14. An actuator 26 is for forcing the piston 22 to move in a direction toward the stationary jaw 24 to crack the nut 18 so that the broken shells 16 can fall into the compartment 14. A control mechanism 28 is operatively associated with the actuator 26 so as to cause operation of the actuator.

The actuator 26 includes an electric motor 30 mounted onto the base 12. A drive wheel 32 rotatable by the motor 30 and a piston arm 34 pivotly connected at pins 36 and 38 between the drive wheel 32 and the piston 22. The control mechanism 28 is an on/off switch electrically connected to the motor 30.

Figure 2:
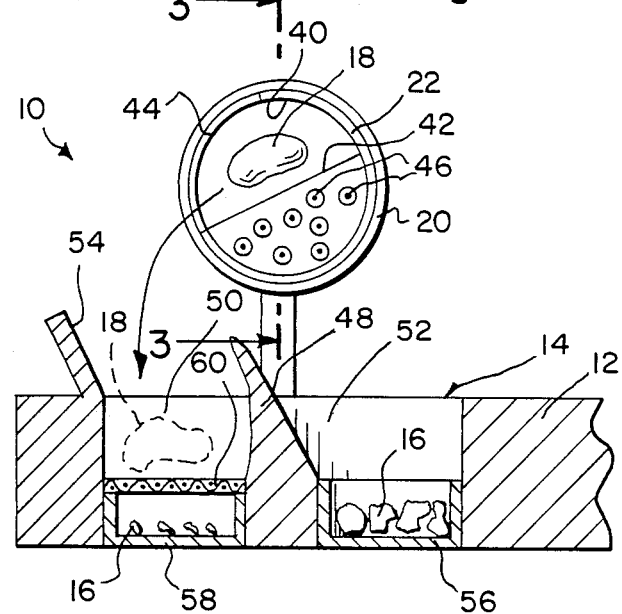
FIG. 2 is a cross sectional view taken along line 2—2 in FIG. 1, showing a modification whereby the shells and nuts are separated into two different compartments.
Figure 3:
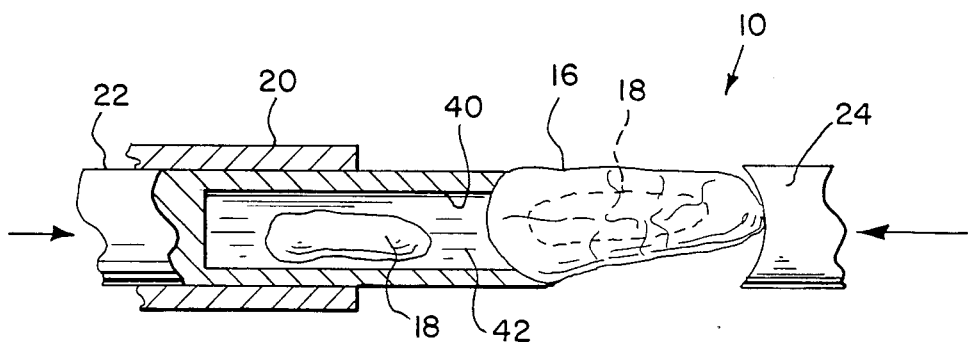
FIG. 3 is a cross sectional view taken along line 3—3 in FIG. 2, showing the aperture within the piston to receive the nut and cause it to fall out to one side into its respective compartment.

As best seen in FIGS. 2 and 3, the nutcracker 10 can further contain a nut receiving chamber 40 formed in the piston 22 facing away from the stationary jaw 24. The chamber 40 has a floor 42 sloping towards a side wall opening 44 so that the nut 18 will fall out through the side wall opening 44 after the shells 18 are cracked away from the nut 18. A plurality of point members 46 are formed on the piston 22 facing towards the stationary jaw 24 to aid in cracking the shells 16 away from the nut 18.

As best shown in FIG. 3, an angular shell deflector 48 is longitudinally formed within the compartment 14 of the base 12 thus dividing the compartment into two segments 50 and 52. One segment 50 is for receiving the nut 18 while the other segment 52 is for receiving the cracked shells 16 from the shell deflector 48. An angular nut deflector 54 is longitudinally formed adjacent the nut receiving segment 50 so as to guide the nut 18 therein when falling from the side wall opening 44 in the piston 22.

A first receptacle 56 is slideably moveable into and out of the shell receiving segment 52 so as to gather the shells 16 therein. A second receptacle 58 is slideably moveable into and out of the nut receiving segment 50. The second receptacle 58 has a screen 60 therein to catch the nut 18 and allow smaller particles of the shells 16 to pass therethrough and into the second receptacle.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An electric powered portable nutcracker comprising:
   (a) a rigid elongated base having an open top compartment for receiving broken shells of a nut;
   (b) a hollow guide sleeve rigidly fixed to and extending along said base;
   (c) a reciprocable piston slidingly moveable along and guided by said guide sleeve;
   (d) an opposed spaced adjustable threaded stationary jaw secured at forward end of said base whereby said guide sleeve and said stationary jaw are located on opposite sides of the compartment;
   (e) an actuator for forcing said piston to move in a direction toward said stationary jaw to crack the nut so that the broken shells can fall into the compartment;

(f) a control mechanism operatively associated with said actuator so as to cause operation of said actuator;
(g) an electric motor mounted onto said base;
(h) a drive wheel rotatable by said motor; and
(i) a piston arm pivotly connected between said drive wheel and said piston; wherein said control mechanism is an on/off switch electrically connected to said motor, further comprising:
(j) a nut receiving chamber formed in said piston facing away from said stationary jaw, said chamber having a floor sloping towards a side wall opening so that the nut will fall out through the side wall opening after the shells are cracked away from the nut;
(k) a plurality of point members formed on said piston facing towards said stationary jaw to aid in cracking the shells away from the nut;
(l) an angular shell deflector longitudinally formed within the compartment of said base thus dividing the compartment into two segments, one segments is for receiving the nut while the other segment is for receiving the cracked shells from said shell deflector;
(m) an angular nut defelctor longitudinally formed adjacent the nut receiving segment so as to guide the nut therein when falling from the side wall opening in the piston;
(n) a first receptacle slideably moveable into and out of the shell receiving segment so as to gather the shells therein; and
(o) a second receptacle slideably moveable into and out of the nut receiving segment, said second receptacle having a screen thereon to catch the nut and allow smaller particles of the shells to pass therethrough and into said second receptacle.

* * * * *